(12) United States Patent
Bertorelle et al.

(10) Patent No.: US 9,294,938 B2
(45) Date of Patent: Mar. 22, 2016

(54) DYNAMIC DATA TRANSMISSION ADJUSTMENT METHOD

(71) Applicant: Sequans Communications, Colombes (FR)

(72) Inventors: Jerome Bertorelle, Neuilly sur Seine (FR); Ambroise Popper, Paris (FR)

(73) Assignee: SEQUANS COMMUNICATIONS, Colombes (FR)

( * ) Notice: Subject to any disclaimer, the term of this patent is extended or adjusted under 35 U.S.C. 154(b) by 187 days.

(21) Appl. No.: 13/765,878

(22) Filed: Feb. 13, 2013

(65) Prior Publication Data

US 2013/0208613 A1      Aug. 15, 2013

(30) Foreign Application Priority Data

Feb. 13, 2012   (EP) ..................................... 12305159

(51) Int. Cl.
    *H04W 24/02*   (2009.01)
    *H04L 1/20*    (2006.01)
    *H04L 1/18*    (2006.01)
    *H04W 28/18*   (2009.01)

(52) U.S. Cl.
    CPC ............. *H04W 24/02* (2013.01); *H04L 1/1887* (2013.01); *H04L 1/203* (2013.01); *H04L 1/1812* (2013.01); *H04L 1/201* (2013.01); *H04W 28/18* (2013.01)

(58) Field of Classification Search
    None
    See application file for complete search history.

(56) References Cited

U.S. PATENT DOCUMENTS

| 2002/0191573 | A1  | 12/2002 | Whitehill et al. | |
| 2009/0252077 | A1* | 10/2009 | Khandekar et al. | 370/312 |
| 2011/0134780 | A1* | 6/2011  | Jersenius et al. | 370/252 |
| 2011/0228700 | A1* | 9/2011  | Mildh ............ | H04B 7/2606 370/254 |
| 2012/0082049 | A1* | 4/2012  | Chen et al. ...... | 370/252 |
| 2012/0087266 | A1* | 4/2012  | Vajapeyam ....... | H04J 11/0056 370/252 |
| 2012/0134275 | A1* | 5/2012  | Choi .............. | H04L 5/0057 370/241 |
| 2013/0223416 | A1* | 8/2013  | Michel ........... | H04W 16/14 370/336 |
| 2013/0281143 | A1* | 10/2013 | Nentwig .......... | H04W 72/1231 455/501 |
| 2013/0315093 | A1* | 11/2013 | Jiang ............. | H04W 52/325 370/252 |

FOREIGN PATENT DOCUMENTS

WO       2006046894 A1    5/2006

OTHER PUBLICATIONS

European Search Report and Written Opinion dated Jul. 24, 2012 for corresponding European Application No. 12 305 159.1, filed Feb. 13, 2012.

* cited by examiner

*Primary Examiner* — Faruk Hamza
*Assistant Examiner* — Andrew Oh
(74) *Attorney, Agent, or Firm* — David D. Brush; Westman, Champlin & Koehler, P.A.

(57) ABSTRACT

A dynamic data transmission adjustment method in a wireless communication system. The system includes a base station and a user equipment. The base station and the user equipment communicate amongst themselves by using a first transmission technique. The method includes transmitting a plurality of frames between the base station and the user equipment using a regular transmission scheme according to the first transmission technique, and at least one iteration of the following steps: calculating a specific error rate in at least one specific region of the transmitted frames; and adjusting the regular transmission scheme when a value representative of the specific error rate associated to the specific region exceeds a predetermined threshold.

6 Claims, 5 Drawing Sheets

DYNAMIC DATA TRANSMISSION ADJUSTMENT METHOD

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates to wireless transmission techniques.

More specifically, the disclosure relates to a method for transmitting data in multi wireless technologies environment. Among wireless technologies, the most recently deployed are LTE (for "Long Term Evolution") and WiMax (for "Worldwide Interoperability for Microwave Access"). Currently, some operators may deploy TD-LTE and WiMAX technologies in close frequency bands. This is for example the case when an already present operator has already deployed a WiMax network and a newly implanted operator needs deploying a LTE network. This may lead to severe interferences because of the proximity of the bands which are used. This disclosure provides a way to limit the impact of this interference, without most of the cost of other existing techniques.

BACKGROUND OF THE DISCLOSURE

Historically, TD-LTE and WiMAX networks both share similar TDD structure. Due to different framing structure, the switch between downlink and uplink transmission is not synchronized across these systems. Therefore, in case both networks are deployed in frequency channels that are close, a severe coexistence issue is created, either at the base station side, or at the terminal side. This is illustrated in the FIG. 1, where the reception (i.e. on the downlink) of data (called LTE data) transmitted by a first base station to a first user equipment (UE1) using LTE technique is being interfered at the user equipment UE1 side by the transmission (i.e. on the uplink) of data (called WiMax data) by a second user equipment to a second base station using the WiMax techniques.

This can prevent proper deployment of a TD-LTE network in such an environment and thus limit the interest for users.

The main issue of interference arises from the so-called near-far effect, in which a given UE (for example UE1) is interfered by a WiMAX UE (for Example UE2) in close vicinity (the "near"), thus preventing the first UE from properly receiving signal from the base station (which is called eNodeB) (the "far"). Specifically, if WiMAX UE is transmitting (beginning of WiMAX uplink), when TD-LTE UE is still receiving the downlink from the eNodeB (end of TD-LTE downlink), then the interference issue arises because WiMAX signal is received at much higher power than signal received from eNodeB.

To avoid these problems, some solutions have been envisaged.

A first solution consist in an alignment of frame structures: this consists of making changes for example to WiMAX and/or LTE frame structures, to have downlink and uplink portions of the frame as aligned as possible. This is possible because both WiMax and LTE are TDD.

A second solution consist in hardware filtering: this consists in using powerful filters on the user equipment side to cope with the interference generated by the other technology.

A disadvantage of the first solution is to dramatically limit the throughput compared to the throughput which should be obtained without the solution. This results in a poor user experience. Indeed, compared to the "normal" expected throughput, the real one is reduced by at least 20%, which is not acceptable.

In other words, aligning frame structure between WiMAX and TD-LTE bears a cost in terms of capacity and maximum throughput, either on WiMAX or TD-LTE network (depending on which one pays the price for alignment). This means direct cost impact for the operators, and degraded user experience.

Moreover, this cost is paid by all devices and the entire network, whereas there may be not so many actual cases where interference arises.

A disadvantage of the second solution is its cost: adding expensive filters results in an increase of the user equipment. To achieve good rejection, it is required to have three filters (two on the reception—Rx-path, and one on the transmission—Tx-path). Each individual filter has a cost estimated to be $0.5 to $1, and thus total added cost is quite high. Furthermore, the existing user equipments, which do not comprise filters, still have difficulties receiving data.

Second, filtering is not possible if the operator wishes to have flexibility on the bands it wants to use with for instance TD-LTE or WiMAX (for instance an operator that would deploy both technologies).

Third, if the band of the TD-LTE operator is non-contiguous, then hardware filtering is nearly impossible to achieve.

SUMMARY

An exemplary embodiment of the invention relates to a dynamic data transmission adjustment method in a wireless communication system comprising a base station and a user equipment, said base station and said user equipment communicating amongst themselves by using a first transmission technique, said method comprising transmitting a plurality of frames between said base station and said user equipment using a regular transmission scheme according to said first transmission technique.

According to at least one embodiment, said method comprises at least one iteration of the following steps:
calculating a specific error rate in at least one specific region of the transmitted frames;
adjusting said regular transmission scheme when a value representative of said specific error rate associated to said specific region exceeds a predetermined threshold.

Thus, an embodiment of the invention proposes a frame transmission optimization method, in which, a step of analyzing the presence of interference is performed on at least two frames received by a base station from a given user equipment, delivering an error rate, and a step of updating a frame transmission scheme to said user equipment when said error rate (or a function of said error rate) exceeds a predetermined threshold.

According to an embodiment, said adjusting step comprise at least one step of restricting a usage of said at least one specific region of the transmitted frames for which said value representative of said specific error rate exceeds said predetermined threshold.

According to an embodiment, said adjusting step comprise rescheduling traffic for preventing the use of said at least one specific region.

According to an embodiment, said specific error rate is an H-ARQ error rate.

According to an embodiment, said value representative said specific error rate is $R=E_{spec}/E_{reg}$ where:

$E_{reg}$ is the average H-ARQ error rate on regular frames of said plurality of frames; and $E_{spec}$ is the H-ARQ error rate on subframe of said at least one specific region.

According to an embodiment, said first transmission technique is LTE.

According to an embodiment, said step of calculating a specific error rate in at least one specific region of the transmitted frames is processed according to a predetermined time interval.

Thus, this allows periodically monitoring the quality of the specific subframes for determining the necessity of realizing an adjustment or to remove an adjustment which has previously been done.

An embodiment of the invention also relates to a dynamic data transmission adjustment device in a wireless communication system comprising a base station and a user equipment, said base station and said user equipment communicating amongst themselves by using a first transmission technique, said device transmitting a plurality of frames between said base station and said user equipment using a regular transmission scheme according to said first transmission technique, According to this embodiment, said device comprises means for iteratively:
  calculating a specific error rate in at least one specific region of the transmitted frames;
  adjusting said regular transmission scheme when said specific error rate associated to said specific region exceeds a predetermined threshold.

According to this embodiment, means for realizing the previously mentioned functions are implemented in the form of chips or microcircuits for example.

In another aspect, an embodiment of the invention also relates to a computer program product downloadable from a communications network and/or stored on a computer-readable support and/or executable by a microprocessor, said computer program product comprising program code instructions for implementing a method for dynamically adjusting data transmission in a wireless communication system comprising a base station and a user equipment, said base station and said user equipment communicating amongst themselves by using a first transmission technique, said method comprising transmitting a plurality of frames between said base station and said user equipment using a regular transmission scheme according to said first transmission technique, According to this embodiment, said computer program product comprising program code instructions for processing at least one iteration of the following steps:
  calculating a specific error rate in at least one specific region of the transmitted frames;
  adjusting said regular transmission scheme when said specific error rate associated to said specific region exceeds a predetermined threshold.

BRIEF DESCRIPTION OF THE DRAWINGS

The proposed method is described in the following by way of examples in connection with the accompanying figures without limiting the scope of the protection as defined by the claim. The figures show:

DETAILED DESCRIPTION OF ILLUSTRATIVE EMBODIMENTS

1. Principles of an Exemplary Embodiment of the Invention

As already explained, wireless transmission technologies are often sources of interferences. This is mainly due to the fact that many wireless transmission technologies use close channel for transmitting/receiving data with similar technologies (for example OFDM). Thus, for a given user equipment, it may be difficult, in some particular situations, to separate the received signal in a useful signal and an interference signal.

However, in some particular situation, the inventors have had the idea to implement a simple and efficient technique which firstly does not unduly reduce the expected throughput and allows a constant monitoring of the interference situation.

The propose method can be used when two or more wireless transmission techniques are implemented in a given geographical area. The proposed method can also be used when these two or more wireless transmission techniques use a predetermined and known frame pattern for transmitting and receiving data. Thus, when a base station, which implements a first wireless transmission technology, has the knowledge of the patterns of the frames transmitted by the conflicting wireless transmission techniques, the base station implements, according to an exemplary embodiment of the invention:

A step of calculating a specific error rate in one or more specific region of the transmitted frames;

A step of adjusting a transmission scheme when the specific error rate associated to said specific region exceeds a predetermined threshold;

According to a particular embodiment, the specific error rate which is monitored is based on Hybrid Automatic Repeat reQuest (HARQ) (When using TD-LTE, it is thus necessary to use the multiplexing mode for HARQ feedback, in order to have visibility per subframe in TDD). This specific rate monitors the number of requests, transmitted by a user equipment to a base station. These repeat requests are usually the result of the impossibility, for the user equipment, to obtain correct data from the base station. Thus, when the base station records a high number of repeat requests for the specific region which is monitored (compared to the number of requests for the entire frame), it can be deduced that a problem occurs in this specific region.

Figure 8:
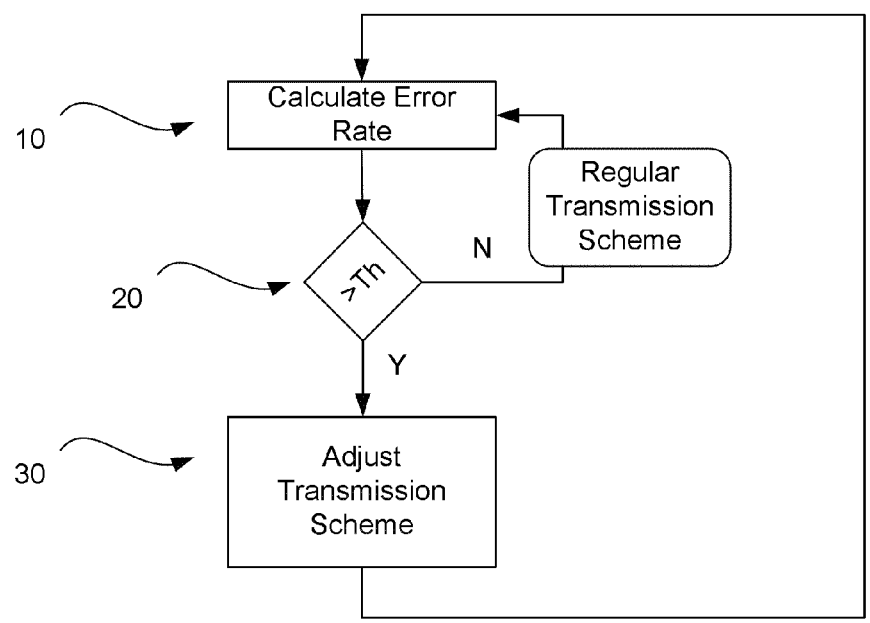
FIG. 8 discloses the main steps of the method of the invention according to an embodiment.

According to a particular feature, the specific regions which are monitored are the regions for which an uplink transmission of a first wireless transmission technique can be in conflict with a downlink transmission of a second wireless transmission technique. In other words, the specific regions which are monitored are the ones which are related to the so called "Near Far Effect". Of course, this is an exemplary embodiment of the invention and The main steps of the method according to an embodiment of the invention are disclosed in FIG. 8.

In a first step, the base station (or another regular equipment of the network which can perform this step), calculates an error rate (10) in one or more specific regions of the transmitted frames (for example a specific subframe).

This error rate is compared (20) to a predetermined threshold (Th). When the error rate exceeds (Y) the predetermined threshold (Th), an adjustment of the transmission scheme is realized (30). This adjustment can be, for example, not using the specific region for transmitting data. This absence of use of this region can be performed during a predetermined period of time. Other adjustment can also be considered in function of the situation (for example allowing the user equipment to transmit data instead of receiving it). When the error rate does not exceed (N) the predetermined threshold (Th), two possibilities are to consider:

- either the current transmission scheme is regular: nothing has to be done.
- or the current transmission scheme has already been adjusted (by a previous iteration): the current transmission scheme is put to regular (e.g. we go back to the regular transmission mode in which the subframes are regularly used).

In at least one embodiment, the proposed method has the following advantages:

a. Bandwidth Saving

In most cases, the TD-LTE and WiMAX terminals will not be collocated, and therefore sacrificing symbols for coexistence (as proposed by full TDD frame alignment) will be a waste of resource. In an embodiment of the invention, the approach is adaptive, and thus does not require a constant and frozen parameterization, which is not adapted to a movable environment.

b. Flexibility

This scheme enables an ad-hoc coexistence scheme that only operates in case of necessity. It does not require any modification on TD-LTE nor WiMAX terminals. Thus the approach of an embodiment of the invention is economically viable.

2. Description of an Embodiment 2.1. Frame(s) Structure(s)

2.1.1 WiMAX Frame Structure

Figure 1:
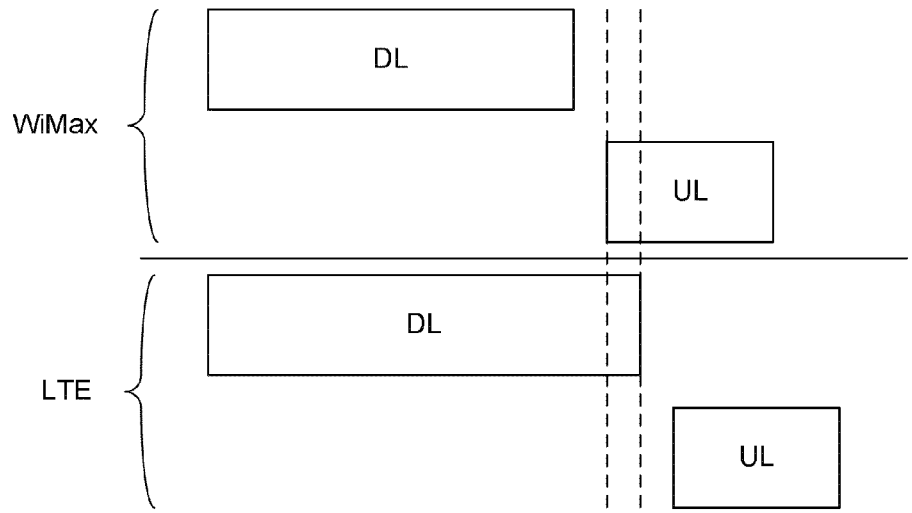
FIG. 1, already commented, discloses the problem of interference between two different transmission techniques took as an example.
Figure 2:
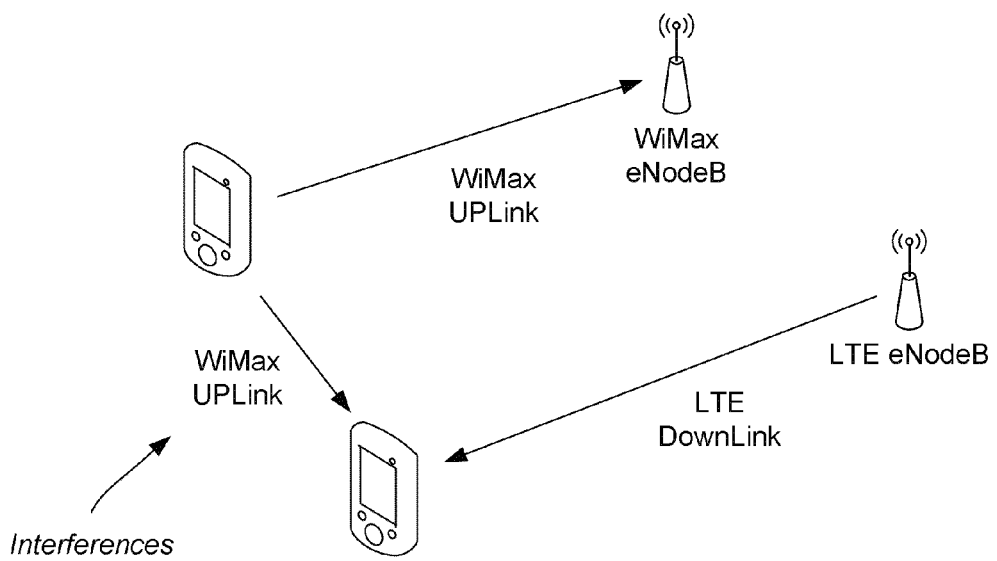
FIG. 2, already commented, discloses the principles of the so called "near/far" effect.
Figure 3:
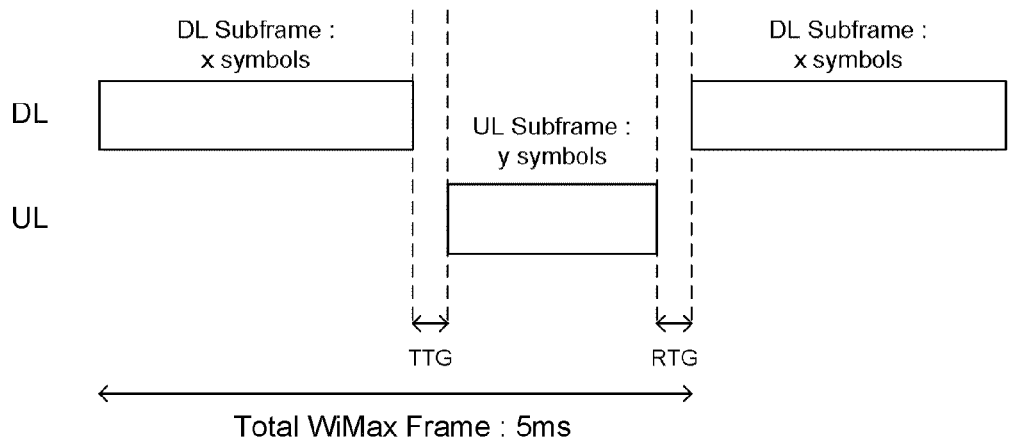
FIG. 3 discloses an overview of the frame structure in WiMax.

WiMAX has a relatively simple frame structure, which is depicted in the FIG. 3. The total duration is 5 ms. The First zone is a DL subframe of typically 29 or 32 symbols. Then switch time before uplink (referred to as TTG). The UL subframe, typically 18 or 15 symbols. Then switch time before the downlink of the next frame (referred to as RTG).

The most common WiMAX frame structure is:
29 DL/18 UL symbols;
TTG: 105 μs;
RTG: 60 μs.

This embodiment of the proposed method according to the invention is focused on this specific structure. However, other structures or other types of frames could also be used.

2.1.2 TD-LTE Frame Structure

Figure 4:
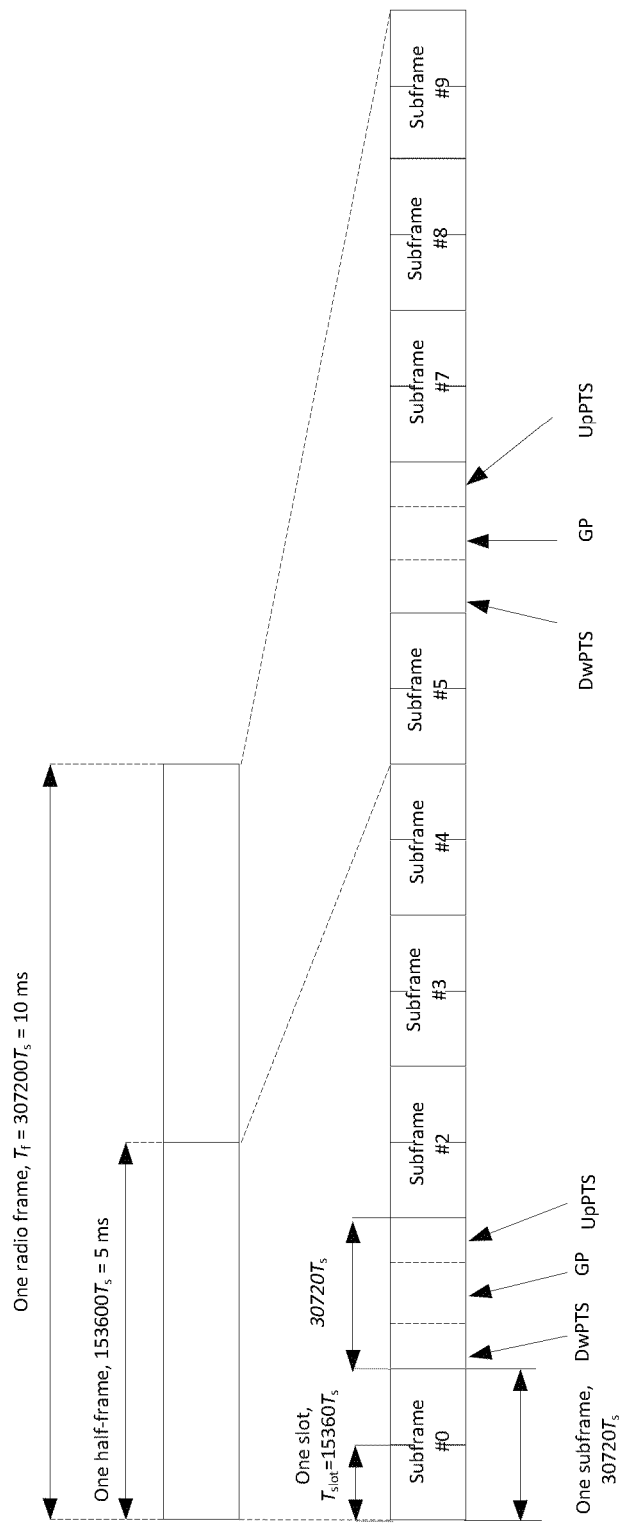
FIG. 4 discloses an overview of the frame structure in LTE.

TD-LTE has several possible frame structures, with lengths of 5 ms and 10 ms (see FIG. 4). For the purpose of this embodiment of the proposed method according to the invention, it is focused on the type 2 (TDD) with 5 ms lengths, as those are the frames that are possibly compatible with WiMAX 5 ms frames.

In FIG. 4, the following acronyms are used:
UpPTS: Uplink Pilot Time Slot;
DwPTS: Downlink Pilot Time Slot;
GP: guard Period;
Ts: Time Symbol;
Tslot: Time Slot.

There are several frame structures, which combine UL and DL differently, as described in the following table.

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

For this embodiment of the proposed method according to the invention, it is considered type 2, where the frame is made of three downlink DL subframes, one special subframe, and one uplink UL subframe.

In the special subframe, there are several configurations, as described by the following table.

| | | Normal cyclic prefix in downlink | | | Extended cyclic prefix in downlink | | |
|---|---|---|---|---|---|---|---|
| | | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |

|  | Normal cyclic prefix in downlink | | | Extended cyclic prefix in downlink | | |
| --- | --- | --- | --- | --- | --- | --- |
|  |  | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 5:
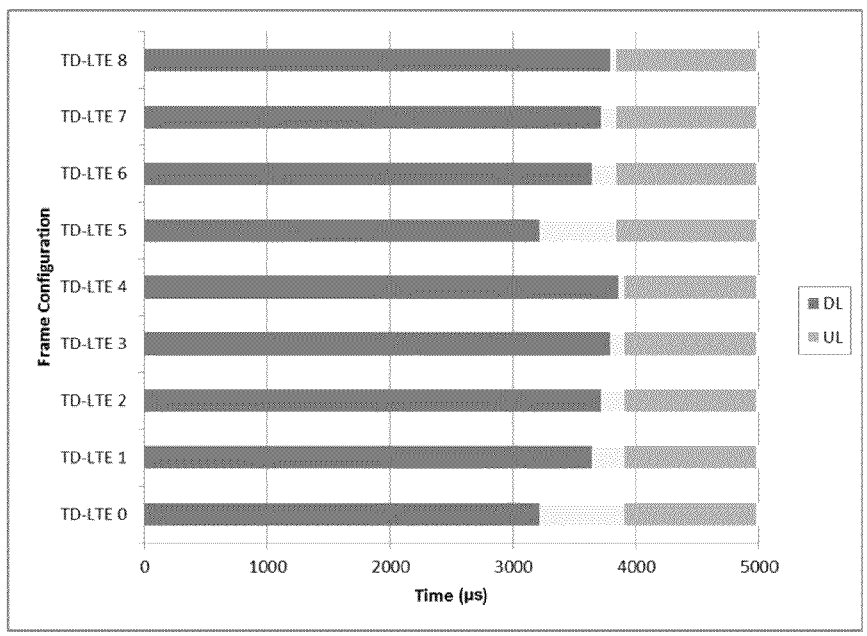
FIG. 5 discloses the possibilities of frame configuration in LTE.

Considering only the normal cyclic prefix usage on DL and UL, the 9 possible configurations are illustrated in the FIG. 5.

2.1.3 Interference Issues in the Common Case

Figure 6:
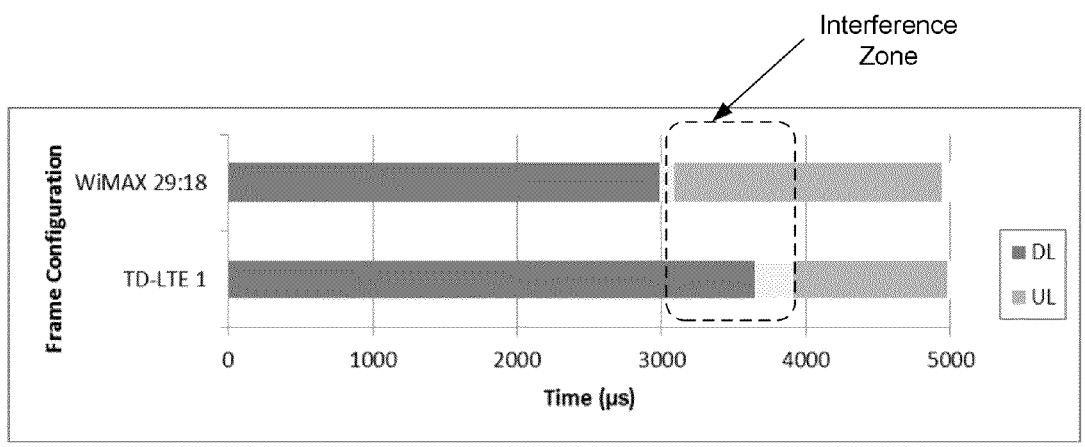
FIG. 6 discloses the interference zone with WiMax 29:18 frame structure and TD LTE1 frame structure.

In case there is absolutely no synchronization between the WiMAX and TD-LTE frame starts, then interference is quite dramatic, as illustrated by the following case (WiMAX 29:18, and TD-LTE configuration 1) in FIG. 6.

2.1.4 Possibilities of Harmonization

Work has been done to show possibilities of harmonizing the frame structures, so as to avoid the near-far interference issue.

Figure 7:
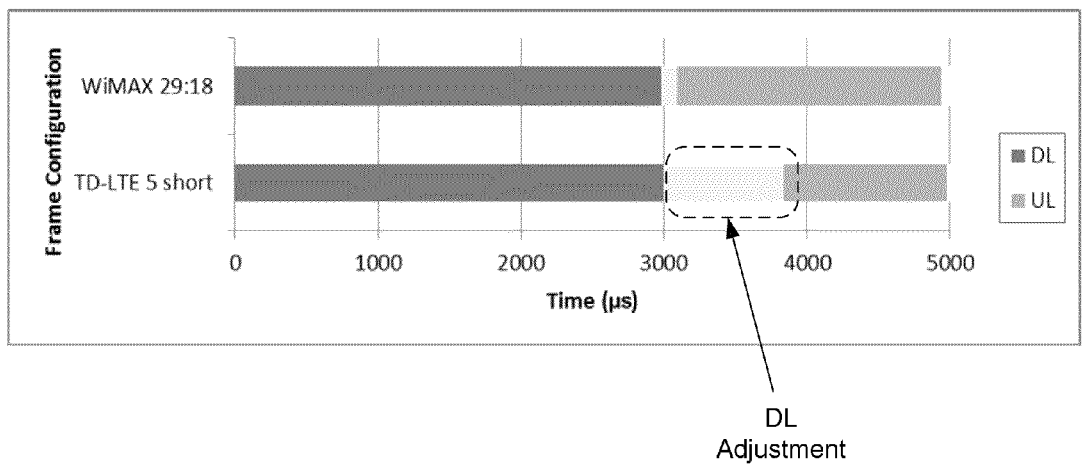
FIG. 7 discloses DL adjustment with WiMax 29:18 frame structure and TD LTE1 frame structure, this DL adjustment resulting of the processing of the disclosed method.

For instance, considering WiMAX 29:18 frame and TD-LTE configuration 5, the inventors have noted that it is possible to enable coexistence by suppressing the data in the special subframe, as illustrated in FIG. 7. In FIG. 7, the inventors have noted that it is possible not to transmit during this special subframe: this is called the DL adjustment. In this embodiment of the proposed method according to the invention, as it will be detailed herein after, DL transmission is not done in this special subframe when a conflict is detected.

Similar schemes exist, which impact the WiMAX network (shortening the UL for instance). This is why this embodiment of the proposed method according to the invention is only an example. Many other possibilities are offered for solving dynamically the problem when near/far effects occur.

2.2 Explanations on the Proposed Method in this Embodiment

In this embodiment, the proposed method consists in having the radio infrastructure side (i.e., the base station, which is also called eNodeB in LTE) detects if specific LTE terminals (i.e. LTE user equipments, UEs) are in a situation of being severely interfered by WiMAX terminals (i.e. WiMax user equipments).

Since frame structure is known for LTE and for WiMax, the possible location of interfered symbols is always the same; therefore the search by the eNodeB can be restricted to that known and identified area. More specifically, in this embodiment, the search is limited to a specific subframe. As already explained before, the LTE frame (a 5 ms frame) comprises 5 subframe. Each subframe has duration of 1 ms (millisecond). In this exemplary embodiment, the subframe #4 may have severe interference issues. This subframe is called "special" subframe. In LTE, this subframe is delivering at most 25% of the downlink for the user equipment. Thus, interferences in this subframe results in bad user experience and optimizing its use in view of the interferences is the idea which forms the base of the disclosed method.

In such situation (i.e. when subframe #4 is severely interfered by another signal), the disclosed method allows eNodeB to dynamically reschedule traffic for the interfered UEs in a different area of the frame, and thus reduce or cancel the deceptive effect the user would feel. However, for reschedule, it is necessary to have knowledge of the presence of interferences. This detection can be done by measuring an error rate in the special subframe.

The metric used for the detection of interferences can be, for instance, based on H-ARQ, but other metrics can also be used.

2.3 Detection of Interference

In case there is a situation of interference, because the location of the WiMAX interference to the TD-LTE reception is always the same, the eNodeB can make a specific search for abnormal errors on the link.

The suggested metric for this embodiment of the proposed method is based on the comparison of H-ARQ error rates. Specifically, the eNodeB should compare the H-ARQ error rate on the special subframe (the subframe that can be impacted by such interference), with error rate on the other subframes (i.e. the subframes which cannot be impacted considering the frame structure).

Let $E_{reg}$ be the average H-ARQ error rate on regular frames, and $E_{spec}$ the H-ARQ error rate on the special subframe.

The eNodeB should compute the ratio $R=E_{spec}/E_{reg}$

A threshold $R_{thresh}$ should be determined by the eNodeB. This threshold indicates the error rate on special subframe. This threshold allows verifying if the error rate is abnormal compared to the regular transmission error rate. This is a system value, and it should be optimized based on empirical measurement (a typical value would be 10).

- If $R>R_{thresh}$, it means that the errors are not due to the overall link quality, but due to the very specific WiMAX interference pattern. In that case, the eNodeB must modify scheduling of data to the given UE, as described in the next section;
- If $R<R_{thresh}$, then either the link quality is good, or it is degraded for other reasons than WiMAX interference. In that case no specific action is to be taken by the eNodeB (apart from regular link adaptation mechanisms, i.e. other actions which are not part of the current patent);

2.4 Mode of Operation when Interference is Detected

When the specific interference pattern is detected, then the eNodeB should not allocate any data for the interfered UE in the special subframe. As a result, this will avoid data to be lost, at the price of reduced maximum throughput for that given UE.

2.5 Return to Regular Operation

On a regular basis (for instance every 10 seconds), the eNodeB should check if WiMAX interference is still present, by reallocating data to the special subframe for that given UE, and comparing the H-ARQ error rate in the special subframe with the other subframes as described earlier.

3. Other Features

Figure 9:
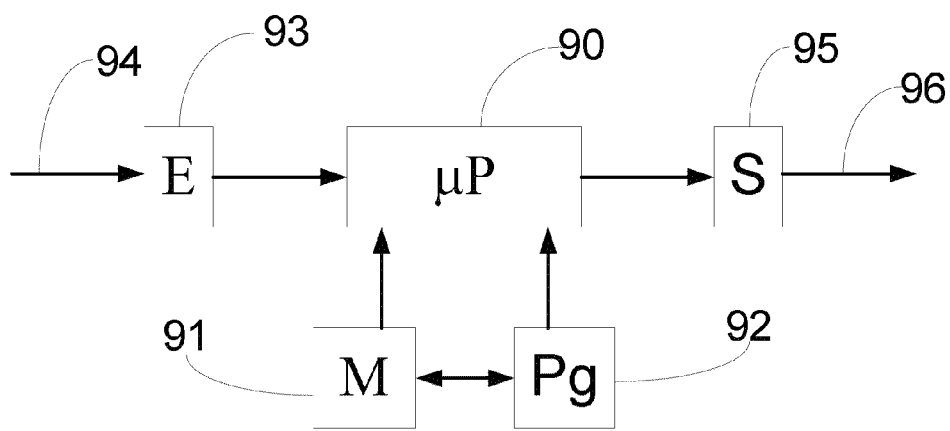
FIG. 9, is a high level description of an apparatus for the implementation of an embodiment.

The structure of an apparatus for the execution of the presented method is illustrated schematically in FIG. 9. It comprises a memory M 91, and a processing unit 90 equipped with a microprocessor μP, that is driven by a computer program (or application) Pg 92. At input, the processing unit 90 receives signal 94 through a network input interface module E 93. The microprocessor μP processes signal 94 according to the instructions of the program Pg 92, to adjust transmission and deliver frames 96 which will be transmitted through an interface module S 95. The apparatus can be included in a mobile station (eNodeB). It can be implemented as a specific chip or integrated in a preexistent chip.

The apparatus comprises:
a calculator for calculating a specific error rate in at least one specific region of the transmitted frames;
an adjuster or a scheduler for adjusting the regular transmission scheme when said specific error rate associated to said specific region exceeds a predetermined threshold.

Although the present disclosure has been described with reference to one or more examples, workers skilled in the art will recognize that changes may be made in form and detail without departing from the scope of the disclosure and/or the appended claims.

The invention claimed is:

1. A dynamic data transmission adjustment method in a wireless communication system comprising a base station and a user equipment, said base station and said user equipment communicating amongst themselves by using a first transmission technique, said method comprising:
transmitting a plurality of frames between said base station and said user equipment using a regular transmission scheme according to said first transmission technique,
at least one iteration of the following acts:
calculating a specific error rate R in at least one specific region of the transmitted frames, wherein $R=E_{spec}/E_{reg}$
where:
$E_{reg}$ is the average Hybrid Automatic Repeat reQuest (H-ARQ) error rate on regular frames of said plurality of frames; and
$E_{spec}$ is the H-ARQ error rate on a subframe of said at least one specific region;
adjusting said regular transmission scheme when a value representative of said specific error rate associated to said specific region exceeds a predetermined threshold, comprising rescheduling traffic to prevent use of said at least one specific region.

2. The method according to claim 1, wherein said adjusting step comprises at least one step of restricting a usage of said at least one specific region of the transmitted frames for which said value representative of said specific error rate exceeds said predetermined threshold.

3. The method according to claim 1, wherein said first transmission technique is Long Term Evolution (LTE).

4. The method according to claim 1, wherein said step of calculating a specific error rate in at least one specific region of the transmitted frames is processed according to a predetermined time interval.

5. A wireless communication device in a wireless communication system comprising a base station and a user equipment, said base station and said user equipment communicating amongst themselves by using a first transmission technique, said device comprising:
a transmitter interface, which transmits a plurality of frames between said base station and said user equipment using a regular transmission scheme according to said first transmission technique, and
means for iteratively:
calculating a specific error rate R in at least one specific region of the transmitted frames, wherein $R=E_{spec}/E_{reg}$
where:
$E_{reg}$ is the average Hybrid Automatic Repeat reQuest (H-ARQ) error rate on regular frames of said plurality of frames; and
$E_{spec}$ is the H-ARQ error rate on a subframe of said at least one specific region;
adjusting said regular transmission scheme when said specific error rate associated to said specific region exceeds a predetermined threshold, comprising rescheduling traffic to prevent use of said at least one specific region.

6. A non-transitory computer-readable medium comprising a computer program product stored thereon and executable by a microprocessor, said computer program product comprising program code instructions for implementing a method of dynamically adjusting data transmission in a wireless communication system comprising a base station and a user equipment, said base station and said user equipment communicating amongst themselves by using a first transmission technique, said method comprising:
transmitting a plurality of frames between said base station and said user equipment using a regular transmission scheme according to said first transmission technique,
processing at least one iteration of the following acts using the microprocessor:
calculating a specific error rate R in at least one specific region of the transmitted frames, wherein $R=E_{spec}/E_{reg}$
where:
$E_{reg}$ is the average Hybrid Automatic Repeat reQuest (H-ARQ) error rate on regular frames of said plurality of frames; and
$E_{spec}$ is the H-ARQ error rate on a subframe of said at least one specific region;
adjusting said regular transmission scheme when said specific error rate associated to said specific region exceeds a predetermined threshold, comprising rescheduling traffic to prevent use of said at least one specific region.

* * * * *